United States Patent
Gawande et al.

(10) Patent No.: US 11,921,698 B2
(45) Date of Patent: Mar. 5, 2024

(54) SYSTEM AND METHOD FOR DATA QUALITY ASSESSMENT

(71) Applicant: Torana Inc., Stamford, CT (US)

(72) Inventors: Sandesh Gawande, Stamford, CT (US); Shrikant Patil, Stamford, CT (US)

(73) Assignee: Torana Inc., Stamford, CT (US)

( * ) Notice: Subject to any disclaimer, the term of this patent is extended or adjusted under 35 U.S.C. 154(b) by 11 days.

(21) Appl. No.: 17/718,623

(22) Filed: Apr. 12, 2022

(65) Prior Publication Data

US 2022/0327109 A1 Oct. 13, 2022

Related U.S. Application Data

(60) Provisional application No. 63/173,721, filed on Apr. 12, 2021.

(51) Int. Cl.
| | | |
|---|---|---|
| *G06F 17/00* | (2019.01) | |
| *G06F 16/22* | (2019.01) | |
| *G06F 16/23* | (2019.01) | |
| *G06F 16/2455* | (2019.01) | |
| *G06F 16/25* | (2019.01) | |

(52) U.S. Cl.
CPC ...... *G06F 16/2365* (2019.01); *G06F 16/2282* (2019.01); *G06F 16/24554* (2019.01); *G06F 16/254* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | |
|---|---|---|
| 6,631,365 B1 | 10/2003 | Neal et al. |
| 6,957,227 B2 | 10/2005 | Fogel et al. |
| 7,069,278 B2 | 6/2006 | Telkowski et al. |
| 7,092,777 B2 | 8/2006 | Reade et al. |
| 7,127,475 B2 | 10/2006 | Goetz et al. |
| 7,243,222 B2 * | 7/2007 | Rothman ............ G06F 11/3636 713/1 |
| 7,464,097 B2 | 12/2008 | Goetz et al. |
| 7,519,614 B2 | 4/2009 | Glania et al. |
| 7,617,261 B2 | 11/2009 | Telkowski et al. |
| 8,195,704 B2 | 6/2012 | Kimmel et al. |
| 8,793,450 B2 | 7/2014 | Bodmer et al. |
| 9,037,550 B2 | 5/2015 | Talkuder et al. |
| 9,110,967 B2 | 8/2015 | Halberstadt |
| 9,207,970 B1 * | 12/2015 | Antanies ............... G06F 9/4825 |
| 9,454,561 B2 | 9/2016 | Gullin |
| 9,477,468 B2 * | 10/2016 | Bradbury ............ G06F 9/30043 |
| 9,576,037 B2 | 2/2017 | Li et al. |
| 9,721,311 B2 | 8/2017 | Babai |
| 9,892,154 B2 | 2/2018 | Barrat et al. |
| 10,331,635 B2 | 6/2019 | Dani et al. |
| 10,409,802 B2 | 9/2019 | Spitz et al. |

(Continued)

*Primary Examiner* — Hung D Le
(74) *Attorney, Agent, or Firm* — Murtha Cullina LLP

(57) ABSTRACT

Methods and systems for providing data assessment across related datasets, including identifying exceptional values in datasets and assessing upstream and or downstream datasets that utilize the exceptional values. Data assessment rules use exceptional values found in a dataset and data lineage information to identify impacted data in upstream or downstream datasets.

14 Claims, 7 Drawing Sheets

(56) References Cited

U.S. PATENT DOCUMENTS

| | | | |
|---|---|---|---|
| 11,651,243 B2* | 5/2023 | Vrouwenvelder | G16H 40/20 |
| | | | 706/12 |
| 2003/0028546 A1* | 2/2003 | Keller | G06F 16/283 |
| 2005/0066240 A1 | 3/2005 | Sykes et al. | |
| 2006/0173924 A1 | 8/2006 | Wotton et al. | |
| 2015/0310166 A1* | 10/2015 | Gronemeyer | G06F 16/2365 |
| | | | 707/687 |
| 2016/0196311 A1* | 7/2016 | Wang | G06F 16/2462 |
| | | | 707/722 |
| 2019/0361767 A1* | 11/2019 | Karthik | G06F 11/0781 |
| 2022/0138207 A1* | 5/2022 | Yelheri | G06F 16/289 |
| | | | 707/722 |
| 2023/0127610 A1* | 4/2023 | Majumdar | G06F 16/248 |
| | | | 707/722 |
| 2023/0297552 A1* | 9/2023 | Chetia | G06F 16/906 |
| | | | 707/687 |

* cited by examiner

100

| CID | Name | Email | Address1 | Address2 | City | Zipcode | State |
|---|---|---|---|---|---|---|---|
| 101 | John | john@abc.com | 100 Main Street | | Stamford | 06905 | CT |
| 102 | Kay | kay@xyz.com | 200 Bedford Street | Suite 202 | Stamford | 06905 | CT |
| 103 | Mary | mary@imn.com | | | New York | 07709 | NY |

200

| CID | Name | Address |
|---|---|---|
| 101 | John | 100 Main Street, Stamford, CT, 06905 |
| 102 | Kay | 200 Bedford Street, Suite 202, Stamford, CT, 06905 |
| 103 | Mary | New York, NY 07709 |

300

| CID | Name | Email |
|---|---|---|
| 101 | John | john@abc.com |
| 102 | Kay | kay@xyz.com |
| 103 | Mary | mary@imn.com |

FIG. 2

| Exception_ID | Object | Record_id | Attribute | Alt_record_id |
|---|---|---|---|---|
| 2001 | Customer | 103 | Address_1 | mary@imn.com |
| 2002 | Customer_address_label | 103 | Address | |

| Issue_type | Trigger_exception_id | Rule_id | Rule_type |
|---|---|---|---|
| Incorrect | | 3 | DQ |
| Incorrect | 2001 | 100 | Assessment |

| ID | Name | Type | Location |
|---|---|---|---|
| 100 | John Doe | Individual | New York |
| 101 | Acme Corp | Corporate | Hartford |
| 102 | Mary Allan | Individual | Texas |

600 —

| Trade Date | Security | Candle Open | Candle Close |
|---|---|---|---|
| 1/3/2020 | IBM | $88 | $90 |
| 1/3/2020 | TSLA | $880 | $920 |
| 1/3/2020 | PLTR | $25 | $25 |
| 1/2/2020 | IBM | $85 | $88 |
| 1/2/2020 | TSLA | $890 | $700 |
| 1/2/2020 | PLTR | $24 | $25 |

700 —

| Trade Date | ID | Security | Quantity | Executed Order Total |
|---|---|---|---|---|
| 1/3/2020 | 100 | IBM | 100 | $9000 |
| 1/3/2020 | 100 | TSLA | 50 | $46000 |
| 1/3/2020 | 101 | PLTR | 300 | $7500 |
| 1/3/2020 | 101 | TSLA | 10 | $9200 |
| 1/3/2020 | 102 | PLTR | 1000 | $25000 |

FIG. 5

SYSTEM AND METHOD FOR DATA QUALITY ASSESSMENT

CROSS-REFERENCE TO RELATED APPLICATIONS

This application claims the benefit of U.S. Provisional Application No. 63/173,721, filed on Apr. 12, 2021, the contents of which are hereby incorporated by reference herein in its entirety.

FIELD OF THE TECHNOLOGY

The present technology is related to the assessment of the quality of data in datasets. More specifically, this technology relates to systems and methods for assessing the quality of data within, across, and between related datasets.

BACKGROUND

Almost all datasets undergo some amount of data quality assessment before the data in the dataset is used. (As used herein, "dataset" refers to a collection of data in any form, including but not limited to a file, database, API, messages, database table, message queue, an analytics report, a business intelligence report (or "BI report")). Data quality processes ensure that data is of a sufficiently high quality to meet the needs of the users. Data quality processes include identifying data inconsistencies or anomalies in a specified dataset and analyzing a dataset to collect statistics and informative summaries about the data. Data cleansing is a process of correcting (or removing) inaccurate data in a dataset. Data quality and cleansing processes are critical because the ability to use data effectively and efficiently depends on the quality of the data.

Additionally, many datasets are built by drawing data records from multiple different datasets and combining the data records in a manner desired by the user to achieve a particular purpose. This creates related datasets having data records with attributes in common or based on attributes in data records in other datasets.

Typical data quality processes identify specific records and attributes within records that have issues in a dataset. (As used herein, "record" refers to a database record as commonly understood in the art and "attribute" refers to a field within a record. "Value" refers to a specific entry in an attribute). But, typical data quality processes do not identify upstream or downstream datasets that are also affected by such issues, nor do they identify the precise data problem in those upstream/downstream datasets. Further, in typical data quality tools, every dataset must be analyzed to determine issues in that dataset. Therefore, data quality rules ("DQ Rules") must be created and run for every single dataset, even related datasets. This increases the implementation effort and is very time-consuming, as it is often required that additional and duplicate DQ Rules be created and executed for every dataset.

Additionally, when a traditional DQ Rule identifies a data problem in a dataset, often the only way to avoid problems in downstream datasets is to stop the process of constructing the downstream dataset altogether. This can cause significant delays and increase costs.

For example, FIG. 1 shows schemas for three sample datasets: a customer table 100, a customer address label report 200, and a customer email list report 300. FIG. 1 also shows the flow of data values from the customer table 100 to the customer address label and customer email list reports 200 and 300. FIG. 1 shows that the following attributes flow to the address field in the customer address label dataset: "address1 104," "address2 105," "city 106," "zipcode 107," and "state 108." The customer email list takes the "cid 301," "name 302" and "email 303" values from the customer dataset, but none of the mailing address-related values. Thus, in this exemplary universe of data, a dataset containing information on customers is used to build datasets for printing mailing address labels (customer address label) and for making an email distribution list (customer mail List).

FIG. 2 shows sample data for the three datasets 100, 200, and 300. The data consists of three records, bearing "cid" 101, 102, and 103 in dataset 100. Attributes from these three records are used as shown in FIG. 2 to populate the datasets 200 and 300.

In a typical system, the next step would be to apply DQ Rules to assess the quality of data in the datasets. DQ Rules help identify the exact row and column in a dataset with a problem or with an otherwise exceptional or unexpected value. For example, a first DQ Rule can be applied to the customer dataset 100 to read the name attribute in each record in the dataset 100 and looks for null values. Such a rule may be called "Name Check." In the example in FIGS. 1 and 2, each name attribute includes a string, so the "Name Check" rule would not return any results. The same is true for an "Email Check" rule that would look for null values in the email field of the records. But, an "Address Check" rule, which checks that the "address1" attribute is not null, would find a null value in the record for "cid" 103, in this example. Thus, in this exemplary embodiment, the DQ Rule identifies the exact row and column in the customer dataset 100 that has a data issue.

In a typical system, the next step would be to run the DQ Rules identified above on other datasets that are related to the customer dataset. However, because the DQ Rules look for null values, these rules would not report any erroneous data since, as shown in FIG. 2, there are no null values in datasets 200 and 300. Nevertheless, because of the problem with the 'address1' attribute in dataset 100, the "Address" attribute in dataset 200 would not work to create a usable mailing address label. The DQ Rules were not able to detect this issue with the downstream dataset.

What is needed, therefore, are more reliable methods and systems for identifying and tracking data quality problems upstream and/or downstream among datasets. What is also needed are more methods and systems for identifying data quality problems that help avoid the complete shutdown of downstream processing tasks.

SUMMARY

According to an embodiment of the technology, a method for assessing data stored in at least two datasets is provided, comprising: assessing one or more first attributes in one or more first records stored in a first dataset; identifying a first attribute with an exceptional value; storing a first entry in an exception table comprising a first object identifier value identifying the first dataset, a first record identifier identifying the first record containing the first attribute with an exceptional value, a first attribute identifier identifying the first attribute with an exceptional value, and a first exception identifier associated with the first entry; identifying, in at least one second dataset, a second record containing a second attribute that utilizes the first attribute with the exceptional value; storing a second entry in the exception table comprising a second record identifier identifying the second record; and linking the second entry to the first entry using the first exception identifier.

In some embodiments, the step of identifying, in at least one second dataset, a second record further comprises searching the second dataset for a record containing at least one of the first record identifier, the first object identifier, and the first attribute identifier. In some embodiments, the step of identifying, in at least one second dataset, a second record, further comprises identifying a match between the first record identifier in the first entry in the exception table to a second record identifier in the second record. In some embodiments, the step of identifying, in at least one second dataset, a second record further comprises identifying a transform function that utilizes the first attribute with the exceptional value to create the second attribute contained in the at least one second record.

In some embodiments, the method further comprises identifying, in at least one third database, a third record that utilizes at least one of the first attribute with the exceptional value and the second attribute. In some embodiments, the step of storing a second entry in the exception table further comprises storing a second attribute identifier identifying the second attribute and a second object identifier identifying the second dataset.

In some embodiments, the method further comprises the step of communicating the second record identifier to an entity able to adjust a downstream process utilizing the second record.

According to another embodiment, a non-transitory computer-readable medium is provided, the medium storing instructions to cause a computing system to: assess one or more first attributes in one or more first records stored in a first dataset; identify a first attribute with an exceptional value; store a first entry in an exception table comprising a first object identifier value identifying the first dataset, a first record identifier identifying the first record containing the first attribute with an exceptional value, a first attribute identifier identifying the first attribute with an exceptional value, and a first exception identifier associated with the first entry; identify, in at least one second dataset, a second record containing a second attribute that utilizes the first attribute with the exceptional value; store a second entry in the exception table comprising a second record identifier identifying the second record; and link the second entry to the first entry using the first exception identifier.

In some embodiments, the instructions to identify, in at least one second dataset, a second record further comprise instructions to search the second dataset for a record containing at least one of the first record identifier, the first object identifier, and the first attribute identifier. In some embodiments, the instructions to identify, in at least one second dataset, a second record, further comprise instructions to identify a match between the first record identifier in the first entry in the exception table to a second record identifier in the second record. In some embodiments, the instructions to identify, in at least one second dataset, a second record, further comprise instructions to identify a transform function that utilizes the first attribute with the exceptional value to create the second attribute contained in the at least one second record.

In some embodiments, the medium further comprises instructions to identify, in at least one third database, a third record that utilizes at least one of the first attribute with the exceptional value and the second attribute.

In some embodiments, the instructions to store a second entry in the exception table further comprise instructions to store a second attribute identifier identifying the second attribute and a second object identifier identifying the second dataset.

In some embodiments, the medium further comprises instructions to communicate the second record identifier to an entity able to adjust a downstream process utilizing the second record.

According to another embodiment, a computer system is provided, comprising: one or more processors; and a non-transitory computer readable medium storing instructions that cause the one or more processors to: assess one or more first attributes in one or more first records stored in a first dataset; identify a first attribute with an exceptional value; store a first entry in an exception table comprising a first object identifier value identifying the first dataset, a first record identifier identifying the first record containing the first attribute with an exceptional value, a first attribute identifier identifying the first attribute with an exceptional value, and a first exception identifier associated with the first entry; identify, in at least one second dataset, a second record containing a second attribute that utilizes the first attribute with the exceptional value; store a second entry in the exception table comprising a second record identifier identifying the second record; and link the second entry to the first entry using the first exception identifier.

In some embodiments, the instructions to identify, in at least one second dataset, a second record further comprise instructions to search the second dataset for a record containing at least one of the first record identifier, the first object identifier, and the first attribute identifier. In some embodiments, the instructions to identify, in at least one second dataset, a second record, further comprise instructions to identify a match between the first record identifier in the first entry in the exception table to a second record identifier in the second record. In some embodiments, the instructions to identify, in at least one second dataset, a second record, further comprise instructions to identify a transform function that utilizes the first attribute with the exceptional value to create the second attribute contained in the at least one second record.

In some embodiments, the computer system further comprises instructions to identify, in at least one third database, a third record that utilizes at least one of the first attribute with the exceptional value and the second attribute. In some embodiments, the instructions to store a second entry in the exception table further comprise instructions to store a second attribute identifier identifying the second attribute and a second object identifier identifying the second dataset. In some embodiments, the computer system further comprises instructions to communicate the second record identifier to an entity able to adjust a downstream process utilizing the second record.

Additional details and feature of embodiments of the technology will now be described in connection with the following drawings.

BRIEF DESCRIPTION OF THE DRAWINGS

FIG. 2 shows sample data in the three sample datasets of FIG. 1.

FIG. 3 shows an exception table according to a first embodiment of the present technology.

FIG. 5 shows a second set of sample data in a second set of three sample datasets to illustrate an embodiment of the technology.

DETAILED DESCRIPTION

The present technology will now be described in additional detail with reference to the drawings.

Figure 4:
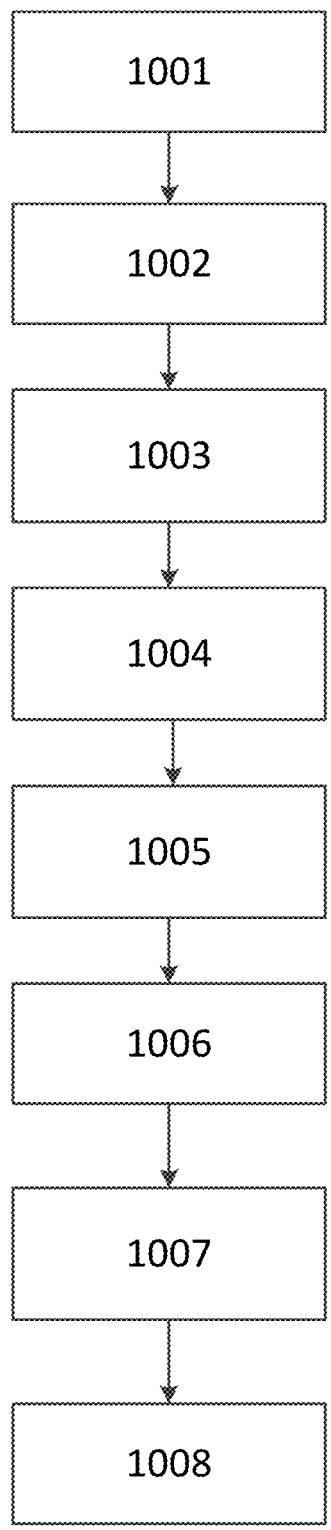
FIG. 4 shows a flow chart of a method according to an embodiment of the present technology.

According to a first embodiment of the present technology, a method is provided for assessing data stored in at least two datasets. In some embodiments, the method comprises assessing data stored in numerous datasets, including, as in the example of FIGS. 1 and 2, three datasets. FIG. 4 shows a flow chart illustrating a method 1000 according to this first embodiment of the technology. Step 1001 includes assessing one or more first attributes in one or more first records stored in a first dataset. In some embodiments, step 1001 includes running a data quality rule to assess one or more attributes in records of a first database. In some embodiments, the step of assessing one or more first attributes includes identifying null values. In some embodiments, the step involves comparing the syntax of a value of an attribute to a predetermined standard value or set of values.

Next, step 1002 includes identifying a first attribute with an exceptional value. In this context an "exceptional" value can mean a null value, an erroneous value, or any value desired by a user to trigger identification. In the context of the example in FIGS. 1 and 2, the null value for the "address1" attribute in record "cid" 103 would be considered an exceptional value.

Next, step 1003 includes storing a first entry in an exception table comprising a first object identifier value identifying the first dataset, a first record identifier identifying the first record containing the first attribute with an exceptional value, a first attribute identifier identifying the first attribute with an exceptional value, and a first exception identifier associated with the first entry. FIG. 3 shows an exemplary embodiment of an exception table consistent with the sample datasets in FIGS. 1 and 2. In this embodiment, the exception table 400 captures a number of attributes. The exception table, in this embodiment, captures the first object identifier value as "Customer," which identifies the customer dataset 100. The table captures a first record identifier as "103," which is the "cid" and identifies the record in dataset 100. The attribute identifier is "address_1" and identifies the attribute in the record in dataset 100 containing the attribute with an exceptional value.

In general, the object identifier captured by some embodiments of the exception table is an indication of the dataset or other file or collection in which the data quality issue or exceptional value was identified. The record_id, in some embodiments, is a value (such as a number or other string) unique to the record in which the issue or exceptional value was identified, which can be used to identify that record. The attribute, in some embodiments, is the field in which the issue was identified.

In some embodiments, including the exception table shown in FIG. 3, additional attributes can be captured. The exception_id field in this embodiment, is a value (such as a number or other string) assigned to the exception to identify it relative to other exceptions. The alt_record_id, in some embodiments, is an alternative identifying value for the record in which the issue or exceptional value was identified.

In some embodiments, issue type provides a code or other information identifying the issue, problem, or exceptional value identified. In some embodiments, a trigger_exception_id is included that identifies the exception_id of the previously identified exception that caused the exception to be identified (as will be further explained). In some embodiments, a rule_id field provides a value identifying the data quality or assessment rule that triggered the exception. In some embodiments, a rule type field identifies the nature or type of the rule that triggered the exception (as will be explained further).

In other embodiments, exception tables contain additional fields. For example, in some embodiments a rule_instance_id is included that is a value identifying the instance of the rule or the run id of the rule. For example, the same rule can run multiple times but each time will have a unique instance id associated with it. In some embodiments, the table includes a rule name field to identify the rule that created the exception. In some embodiments, the table includes a create_dttm field to identify the date and/or time the exception was created. In some embodiments, the exception table includes a status field to identify of whether the exception is valid or invalid. For example, in one embodiment, when a rule identifies an exception, it will be by default valid, but a user can later manually mark it invalid if, for example, the time to fix the issue has passed or that exception is no longer valid anymore for whatever reason. In some embodiments, the table includes a trigger type field that identifies whether the rule that generated the exception was triggered manually or automatically.

Next, in this embodiment, step 1004 includes identifying, in at least one second dataset, a second record containing a second attribute that utilizes the first attribute with the exceptional value stored as the first entry in the exception table. In some embodiments, the step 1004 of identifying, in at least one second dataset, a second record further comprises searching the second dataset for a record containing at least one of the first record identifier, the first object identifier, and the first attribute identifier. For example, in the embodiment of FIGS. 1 and 2, the method includes looking for the "cid" 103 (the record identifier) associated with the attribute in which an exceptional value (in this case, a null value) was found ("address_1") in a record in the second dataset (here, dataset 200). Thus, in some embodiments, the step 1004 of identifying, in at least one second dataset, a second record, further comprises identifying a match between the first record identifier in the first entry in the exception table to a second record identifier in the second record.

Step 1005 includes storing a second entry in the exception table comprising a second record identifier identifying the second record. In some embodiments, step 1005 further comprises storing a second attribute identifier identifying the second attribute and a second object identifier identifying the second dataset. For example, in the embodiment of FIGS. 1 and 2, when the cid 103 is identified in dataset 200, a new record is made in the exception table 400 that includes that cid 103. This record also identifies the object as dataset 200 (customer_address_label) and the attribute as "address," as this is the attribute in dataset 200 that utilizes the attribute address_1 from dataset 100.

Figure 1:
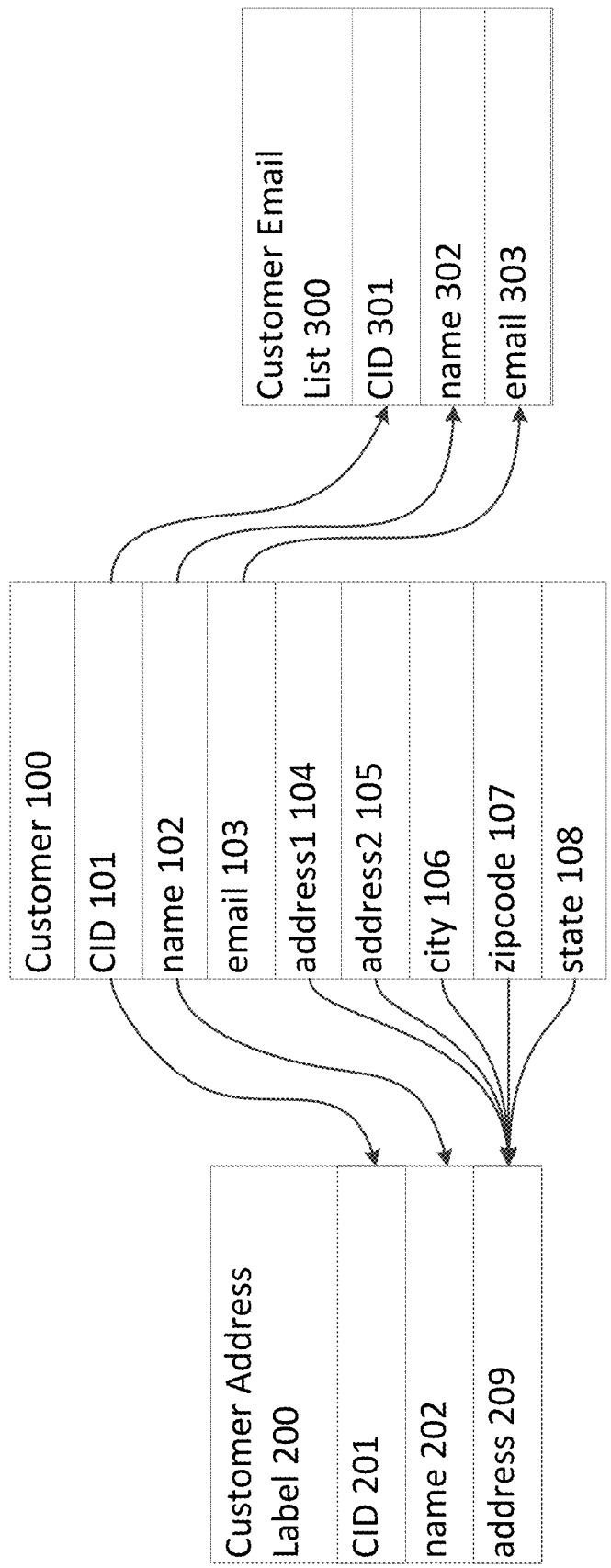
FIG. 1 shows sample schemas for three sample datasets for illustrating embodiments of the technology.

Step 1006 includes linking the second entry to the first entry using the first exception identifier. As shown in the embodiment of FIGS. 1-3, the second entry in the exception table 400 includes as the trigger_exception_id the value 2001, which is the exception_ID of the first entry. In this manner, at least one downstream dataset is identified that may be impacted by an exceptional value in a record in an upstream dataset.

In some embodiments, the data assessment rules that identify the downstream dataset is referred to as "assessment rules." In some embodiments, a set of assessment rules are stored in a memory location accessible by a processor configured to assess the datasets. For example, in the embodiment of FIGS. 1-3, a rules database has a set of DQ rules and a set of assessment rules for assessing the quality of the data in datasets 100, 200, and 300. The set of DQ rules include "Name Check," "Email Check," and "Address Check," as described above. Running the DQ rules against dataset 100 has identified that the "address1" attribute in cid 103 has a null value. In this embodiment, the assessment rules can be considered functions that are run against the datasets using the outputs of the DQ rules. The assessment rules are designed to identify downstream datasets impacted by data problems identified by the DQ rules.

In this embodiment, a first assessment rule or function, described above, is named "customer_address_label_ast_rule", and is run on the customer address label dataset in order to identify all instances of customer ids (cid) that match cids identified by the DQ rules as including a null value in either the name field or the address field. In this embodiment, a second assessment rule or function is named "customer_email_list_ast_rule" and is run on the customer email list dataset 300 in order to identify all instances of customer ids (cid) that match cids identified by the DQ rules as including a null value in either the name field or the email field. (In this embodiment, customer_email_list_ast_rule, when run against the customer email list dataset 300, does not find any failures because the dataset 300 does not include any nulls in the email attribute).

In this embodiment, whenever a DQ rule identifies a data issue, it captures the issue in the exception table 400. The assessment rules take their inputs from the information captured and saved in the exception table. In some embodiments, once the exception table is populated by a DQ rule, the assessment rules are automatically triggered to run on the selected datasets. In other embodiments, the assessment rules are manually initiated by a user who is notified of the exception identified by the DQ rules. If the assessment rules identify impacted records in the downstream dataset, these records are also captured in an exception table for review and remedial action if necessary. In other embodiments, the exception is captured in a file. In other embodiments, the exception is transmitted as a message to a user or administrator of the system. In some embodiments, the system will subscribe to and receive these messages/exceptions and will execute the necessary functions. In some embodiments, messages and other notifications related to exceptions are sent to third party systems, such as email clients, messaging systems, etc.

Assessment rules for identifying downstream databases function differently in other embodiments. In some embodiments, step 1006 further comprises identifying a transform function that utilizes the first attribute with the exceptional value to create at least one second attribute contained in the at least one second record. For example, a set of data transform functions configured to adapt data from dataset 100 for downstream use can include information readable by the assessment rules for identifying the downstream database that utilizes one or more attributes from the upstream dataset. In some embodiments, a transform function contains information that is readable by an assessment rule to identify which attributes from the upstream dataset are transformed by the transform function to output a value for inclusion in the downstream dataset. In the example of FIGS. 1-3, a transform function operates to combine the address1, address2, city, state, and zipcode attributes from dataset 100 into the address attribute used in dataset 200. In some embodiments, once a DQ rule identifies an issue with the address1 attribute in record cid 103, an assessment rule assesses this transform function to identify that it utilizes the address1 attribute and then stores an exception as shown in table 400.

In other embodiments, the assessment rules are configured to assess a table identifying data lineage relationships between the datasets. For example, a dataset is created that stores the upstream/downstream relationships between the dataset 100, 200, and 300 and which attributes are utilized by each dataset. When an assessment rule is given as input an attribute that was identified as having an exceptional value by a DQ rule, the assessment rule reads the relationship dataset to find any records indicating downstream (or upstream) datasets that utilize the attribute with the exceptional value. Thus, in various embodiments of the technology, there are various ways in which assessment of downstream/upstream databases is achieved to identify records that utilize an attribute having an exceptional value from another database.

In some embodiments, assessment of the downstream/upstream databases proceeds only up to the identification of records that utilizes the exceptional value. In other embodiments, additional assessment in the form of assessing the particular attributes in the downstream/upstream database is also undertaken. This additional assessment is achieved, for example, by software coding to assess the syntax of the attribute and ensure that it matches syntax that would be acceptable. For example, an attribute such as "address" in dataset 200 in FIGS. 1-3 would require a mailing address label syntax. Software coding would compare the syntax of the attribute to a mailing address format standard. Different assessment rule coding is employed in other embodiments to identify different types of errors. For example, consider a sample downstream dataset that assembles a date record by pulling a day value, month value, and year value each from separate datasets. An assessment rule could be coded to ensure that the year value is in four-digit format by assessing the number of characters. Any appropriate coding can be employed to assess an attribute in other embodiments in order to obtain the information necessary. As another example, a rule to assess the format of an email address attribute can be coded to look for a series of acceptable characters followed by an "@" symbol, followed by a known domain (such as gmail.com or hotmail.com).

In other embodiments, an assessment rule uses an object value from the exception table as an additional means to isolate an affected record in a downstream dataset. For example, a downstream dataset can pull in records from different datasets and aggregate them. In some such cases, multiple records in the downstream dataset may have the same "record_id", but would have different "object" values to denote the different origins of their attributes. In such a case, the object value is used as an additional differentiator in the function. In other embodiments, use of the object value in this way is not necessary. The assessment rules are customizable for the data collection at issue.

Further with regard to the example of FIGS. 1-3, the assessment rule identifies that the address attribute for record 103 in the customer address label dataset 200 is not a complete mailing address. As a result, this failure is captured in the exception table shown in FIG. 3. Notably, the newly identified exception is given a unique exception_id (2002), and also includes as its trigger_exception_id the value 2001, which is the exception_id of the DQ rule exception that initiated the assessment rule. The trigger_exception_id permits tracking the exception through the related impacted datasets for auditing purposes, for example.

In some embodiments, the method includes step 1007 of identifying, in at least one third database, a third record that utilizes at least one of the first attribute with the exceptional value and/or the second attribute. In some embodiments, assessment of downstream and/or upstream databases using assessment rules can have a cascading effect. For example, in some such embodiments, a first assessment rule finds a first exception (#a), which triggers a second assessment rule (#2), which finds a second exception (#b). This second exception (#b), in turn, causes a third assessment rule (#3) to trigger, and so on for as long as the particular datasets require.

Figure 6:
FIG. 6 shows an exception table according to a second embodiment of the present technology.

FIGS. 5 and 6 show another example of an embodiment of the present technology, which illustrates a "cascading" effect of downstream assessment of datasets. FIG. 5 shows three exemplary datasets with sample data and that are related: an account dataset 500, an instrument dataset 600, and a positions dataset 700. The account dataset 500 includes three records, each associated with an investment account and an account id "aid": 100, 101, and 102. Instrument dataset 600 includes records associated with the opening price (open_price) and (eod_price) for securities (IBM, TSLA, PLTR) for each day (price_date). Finally, the position dataset 700 includes records identifying the investment positions in each of the accounts on each day, and includes an attribute for the value of each position at the end of each day. As is apparent, the datasets are related, at least in that the daily current value of a position (curr_value (quantity* eod_price)) in the position dataset 700 depends on the "eod_price" value from the Instrument table.

In this embodiment, the owner of the datasets 500, 600, and 700 may wish to provide daily performance reports to the account holders in the account dataset 500. The owner of the datasets will thus wish to perform quality control measures on the data to ensure accuracy in its reports, as well as to flag certain occurrences as needed. For example, in this embodiment, the owner may wish to flag accounts in which a position changes value by more than 15% in a single day. In one embodiment, this could be achieved by first implementing a DQ rule that triggers an exception whenever an eod_price is recorded in the instrument dataset 600 for a security that is more than 15% greater or lesser than the previous day's eod_price for that security. In this embodiment shown in FIGS. 5 and 6, this DQ rule has rule_id 1 and rule name "clos_pricethreshold_check" as shown in the exemplary exception table in FIG. 6.

In this embodiment, dataset 600 shows an eod_price for TSLA on 1/2/2020 of $700 and an eod_price for TSLA on 1/3/2020 of $920. This wide variance in price would trigger the DQ rule "clos_price_threshold_check" which would cause the system to create a first entry in the exception table 800. This entry identifies the Object as the "instrument" dataset, the Record_id as "price_date":"1/3/2020","security":"TSLA", and the Attribute as eod_price. The first entry is identified with exception_id 4001.

In this embodiment, the first entry in the exception table triggers a first assessment rule A, named "Get_impacted_positions_ast_rule." This rule is used to identify any positions impacted by the price issue identified by the DQ rule 1. Assessment rule A looks for the price date and the security identified by the DQ rule 1 and stored in the exception in the position dataset 700.

In this embodiment, assessment rule A finds two impacted positions in the positions dataset 700, and creates two entries in the exception table 800 having exception_id 4002 and 4003. These entries identify the Object as the "position" dataset and the Attribute as the "curr_value" field from the dataset 700. Exception 4002 identifies the Record_id as ("price_date":"1/3/2020","aid":100,"security":"TSLA"), while exception 4003 identifies the Record_id as ("price_date":"1/3/2020","aid":101,"security":"TSLA").

Next, in this embodiment, exceptions 4002 and 4003 trigger a second assessment rule B, which uses the results of assessment rule A to identify the accounts impacted by the eod_price fluctuation. In this embodiment, assessment rule B is named "Get_impacted_accounts_ast_rule." In this embodiment, assessment rule B looks for the "aid" values identified by assessment rule A in the account database 500. In this example, accounts with "aid" 100 and 101 were identified by the assessment rules. Thus, this example shows the cascading effect of the assessment rules. A DQ rule identifies an exceptional value in a first database, information about the relevant database, record, and attribute are stored in an exception table, this triggers an assessment rule to assess a related database which identifies records in the related database that are impacted by the exceptional value, these additional records are identified in the exception table, which triggers a second assessment rule to assess another related database to identify additional records even further downstream that have been affected. The assessment rules use information about potentially problematic data entries and assess the impact on downstream databases. In this embodiment, assessment rule A takes as input the relevant security and date to identify affected positions of the security value datapoint. Assessment rule B takes the affected positions and outputs affected account ids so that appropriate action can be taken.

Thus, in some embodiments, the method further comprises the step 1008 of communicating a record identifier from the exception table to an entity able to adjust a downstream process utilizing the second record. In the example of FIGS. 5-6, the data owner may wish to suspend production of an account performance report for account aids 100 and 101 until further investigation into the price anomaly is complete. This is effected in some embodiments by transmitting a notification of the affected accounts to a user, or by sending the exception table or portions of the exception table. The user can then suspend creation of the reports for those accounts, while allowing the process to continue with respect to any unaffected accounts.

Notably, because the system has pinpointed the potentially problematic records in the downstream database, the user need not stop the entire report generation process as to all accounts. This increases the efficiency with which downstream process reliant on the data can be completed. The user can address those records with potential data issues while the task is completed for unaffected records.

Different embodiments include different DQ and assessment rule schemes depending on the datasets at issue. The present technology is customizable in the sense that a data owner can create any number and type of assessment rules for improving his or her ability to analyze downstream or upstream datasets. Each dataset of a group of dataset can have its own unique set of DQ and Assessment rules.

Figure 7:
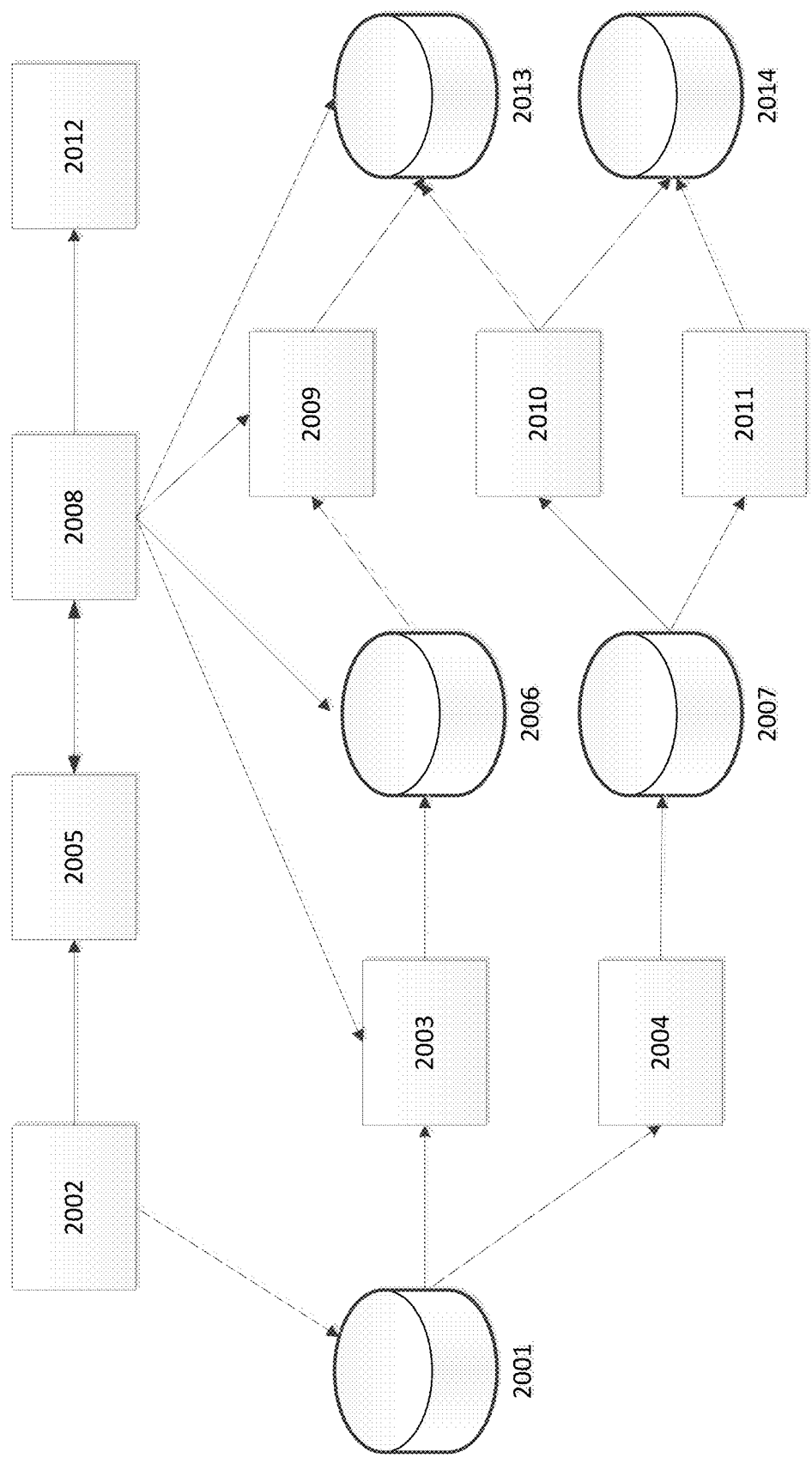
FIG. 7 shows an overall system environment according to an embodiment of the technology.

FIG. 7 shows an overall system environment according to at least one embodiment of the present technology. A first dataset 2001 contains at least one dataset. A module 2002 contains executable software code that includes instructions for applying one or more data quality rules against the data in the dataset 2001. The module 2002 sends data related to any exceptional values it identifies to the exception table 2005. The exception table 2005 is in the form of, in some embodiments, a dataset containing records associated with each exceptional value identified by the data quality rules in module 2002.

FIG. 7 also shows two transform modules 2003 and 2004 which operate on the data in database 2001 and transform it into datasets 2006 and 2007, respectively. Notably, in some embodiments, downstream datasets 2006 and 2007 may also receive data from other datasets in addition to dataset 2001, which are not shown in FIG. 7. The transform modules contain software code with instructions or scripts for editing, adding, concatenating, or otherwise transforming data records and attributes from a dataset.

Assessment module 2008 contains assessment rules for assessing downstream databases in response to exceptional values found by a DQ rule. The assessment module 2008 takes as inputs exceptions identified in the exception table 2005, and then executes the assessment rules (functions, in some embodiments). In some embodiments, the assessment rules read the transform modules 2003 and/or 2004 to identify data lineage characteristics of exceptional values. In some embodiments, the assessment rules read the data records in the downstream datasets 2006 and/or 2007 for data lineage information.

The assessment module 2008 then adds entries to the exception table to identify any downstream data records and/or attributes that are impacted by the exceptional value identified by the DQ rule.

In some embodiments, additional transform modules 2009, 2010, and 2011 perform additional data transformations for use in datasets 2013 and 2014. In some embodiments, the assessment module 2008 assess data lineage information from the modules 2009, 2010, and 2011 and the datasets 2013 and 2014.

Once the assessment rules have been run and entries added to the exception table 2005, an output 2012 is provided to alert a user to the exceptional values and impacted datasets, records, and attributes.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A non-transitory computer-readable medium storing instructions for causing a computing system to:
   assess one or more first attributes in one or more first records stored in a first dataset;
   identify a first attribute with an exceptional value;
   store a first entry in an exception table comprising a first object identifier value identifying the first dataset, a first record identifier identifying the first record containing the first attribute with an exceptional value, a first attribute identifier identifying the first attribute with an exceptional value, and a first exception identifier associated with the first entry;
   identify, in at least one second dataset, a second record containing a second attribute that utilizes the first attribute with the exceptional value;
   store a second entry in the exception table comprising a second record identifier identifying the second record; and
   link the second entry to the first entry using the first exception identifier.

2. The medium of claim 1, wherein the instructions to identify, in at least one second dataset, a second record further comprise instructions to search the second dataset for a record containing at least one of the first record identifier, the first object identifier, and the first attribute identifier.

3. The medium of claim 2, wherein the instructions to identify, in at least one second dataset, a second record, further comprise instructions to identify a match between the first record identifier in the first entry in the exception table to a second record identifier in the second record.

4. The medium of claim 1, wherein the instructions to identify, in at least one second dataset, a second record, further comprise instructions to identify a transform function that utilizes the first attribute with the exceptional value to create the second attribute contained in the at least one second record.

5. The medium of claim 1, further comprising instructions to identify, in at least one third database, a third record that utilizes at least one of the first attribute with the exceptional value and the second attribute.

6. The medium of claim 1, wherein the instructions to store a second entry in the exception table further comprise instructions to store a second attribute identifier identifying the second attribute and a second object identifier identifying the second dataset.

7. The medium of claim 1, further comprising instructions to communicate the second record identifier to an entity able to adjust a downstream process utilizing the second record.

8. A computer system, comprising:
   one or more processors; and
   a non-transitory computer readable medium storing instructions that cause the one or more processors to:
      assess one or more first attributes in one or more first records stored in a first dataset;
      identify a first attribute with an exceptional value;
      store a first entry in an exception table comprising a first object identifier value identifying the first dataset, a first record identifier identifying the first record containing the first attribute with an exceptional value, a first attribute identifier identifying the first attribute with an exceptional value, and a first exception identifier associated with the first entry;
      identify, in at least one second dataset, a second record containing a second attribute that utilizes the first attribute with the exceptional value;
      store a second entry in the exception table comprising a second record identifier identifying the second record; and
      link the second entry to the first entry using the first exception identifier.

9. The computer system of claim 8, wherein the instructions to identify, in at least one second dataset, a second record further comprise instructions to search the second dataset for a record containing at least one of the first record identifier, the first object identifier, and the first attribute identifier.

10. The computer system of claim 9, wherein the instructions to identify, in at least one second dataset, a second record, further comprise instructions to identify a match between the first record identifier in the first entry in the exception table to a second record identifier in the second record.

11. The computer system of claim 8, wherein the instructions to identify, in at least one second dataset, a second record, further comprise instructions to identify a transform function that utilizes the first attribute with the exceptional value to create the second attribute contained in the at least one second record.

12. The computer system of claim 8, further comprising instructions to identify, in at least one third database, a third record that utilizes at least one of the first attribute with the exceptional value and the second attribute.

13. The computer system of claim 8, wherein the instructions to store a second entry in the exception table further comprise instructions to store a second attribute identifier identifying the second attribute and a second object identifier identifying the second dataset.

14. The computer system of claim 8, further comprising instructions to communicate the second record identifier to an entity able to adjust a downstream process utilizing the second record.

\* \* \* \* \*